Sept. 23, 1930.     H. W. HOPKINS     1,776,627
CORN HARVESTING AND HUSKING ATTACHMENT FOR TRACTORS
Filed May 4, 1926     4 Sheets-Sheet 2
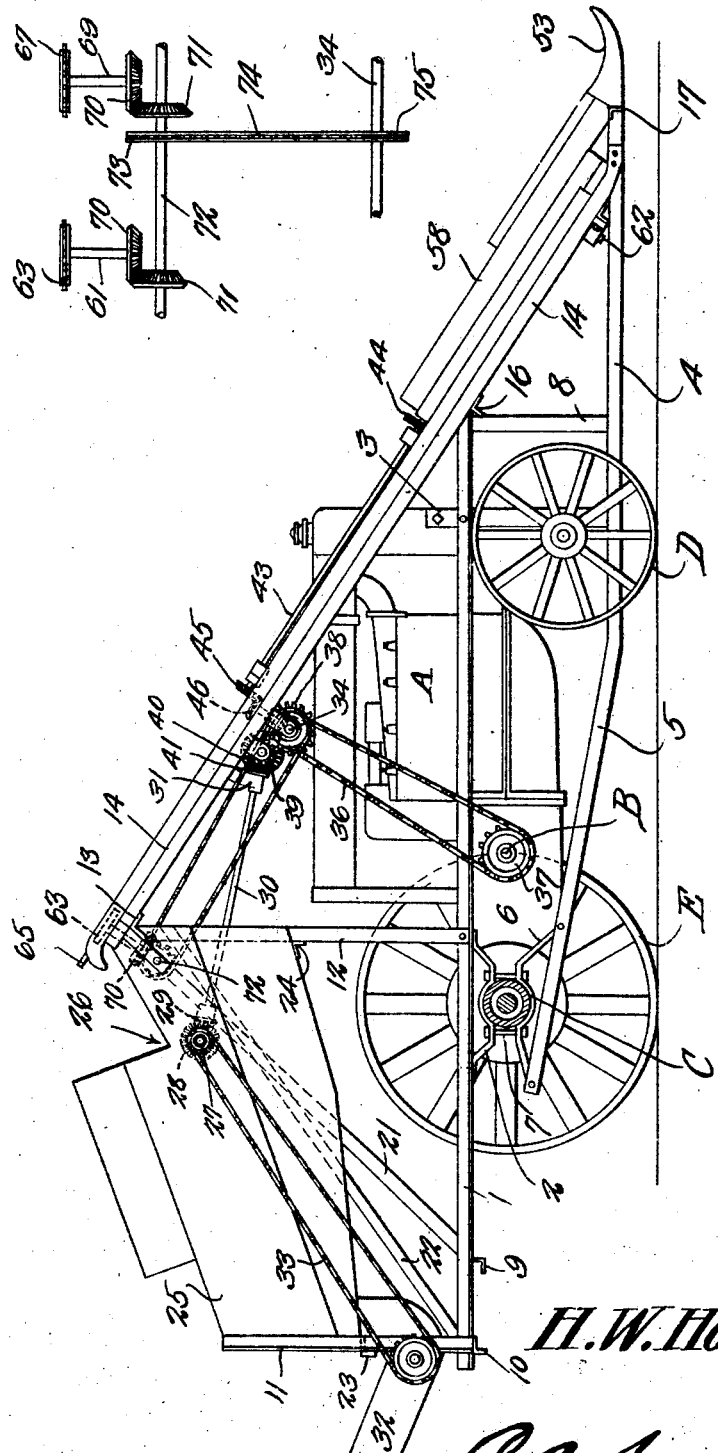
H. W. Hopkins
Inventor,
By C. A. Snow & Co.
Attorneys.

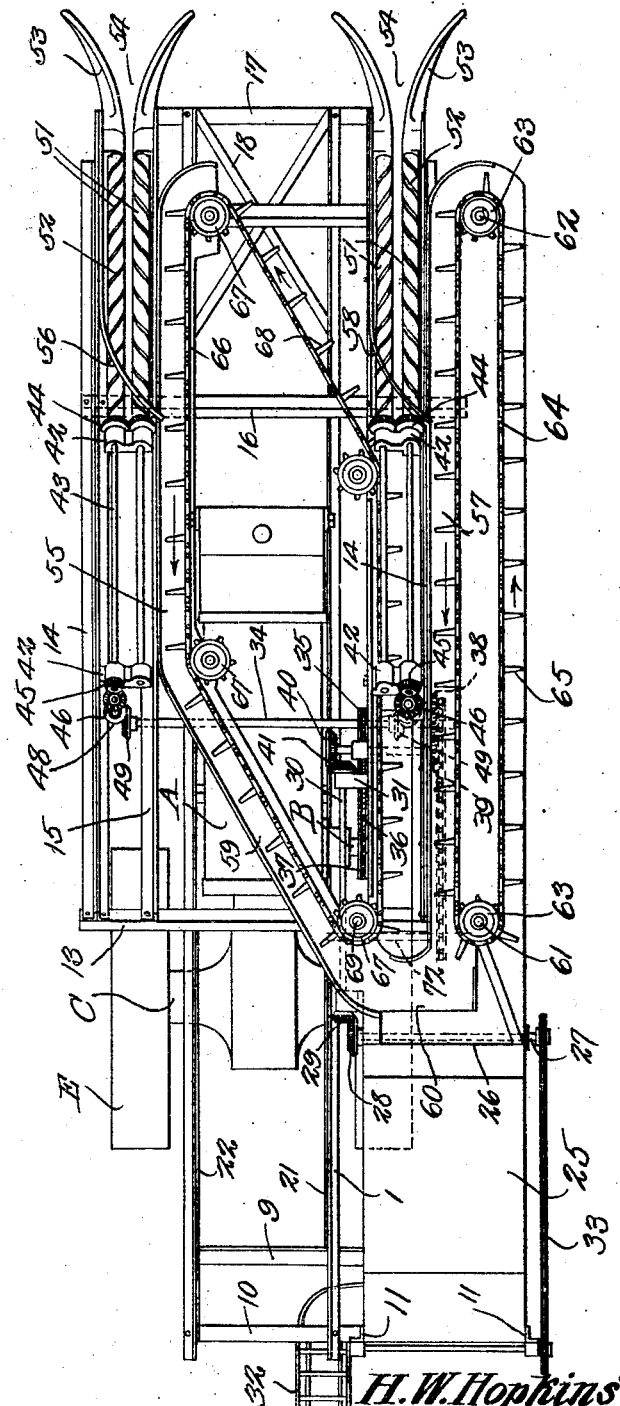

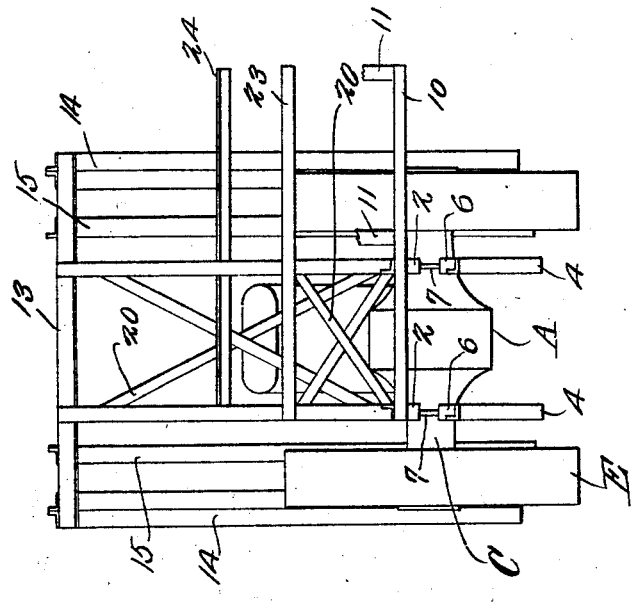
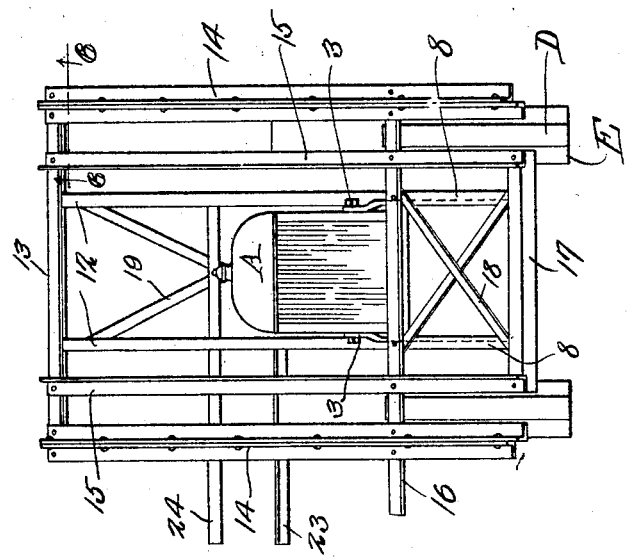

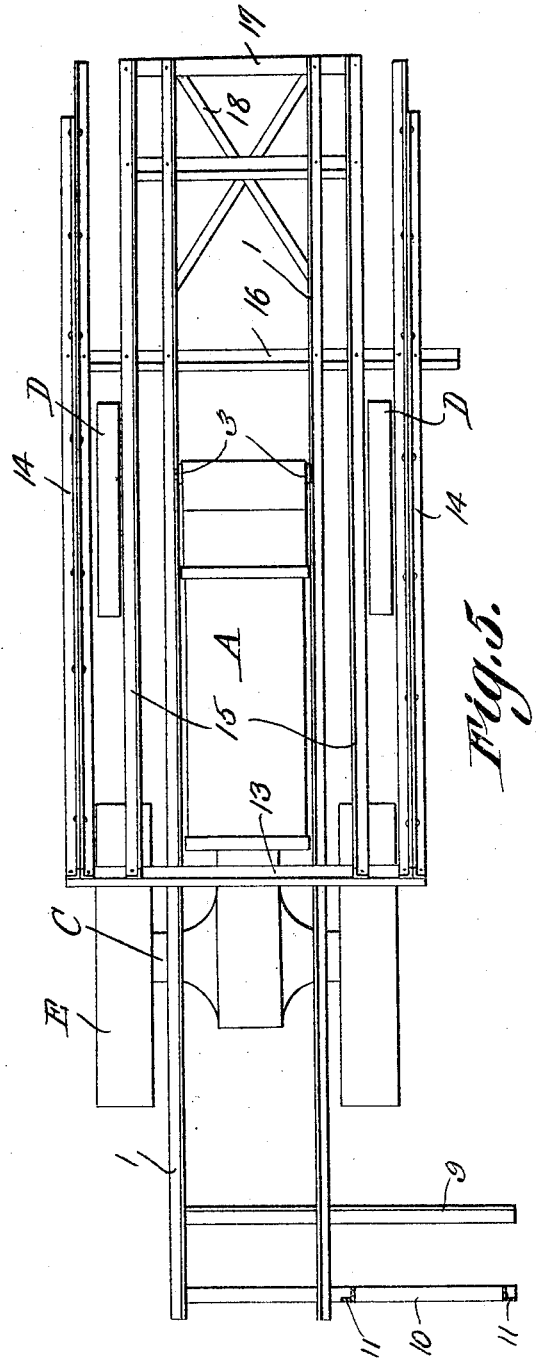
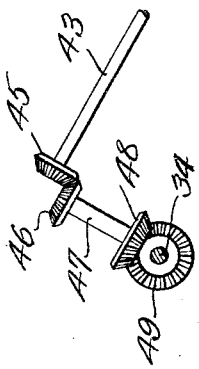
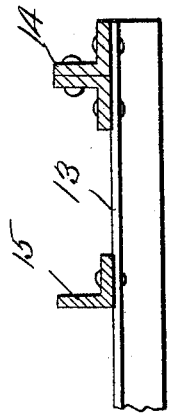

Patented Sept. 23, 1930

1,776,627

UNITED STATES PATENT OFFICE

HIRAM W. HOPKINS, OF WHITING, IOWA

CORN HARVESTING AND HUSKING ATTACHMENT FOR TRACTORS

Application filed May 4, 1926. Serial No. 106,672.

This invention relates to an attachment for use in connection with tractors whereby, by driving a tractor along rows of standing corn, the ears can be snapped from the stalk, conveyed rearwardly to a husking mechanism and thereafter delivered from the machine.

Another object is to provide an attachment of this character which can be applied readily to a tractor of a type already in use without necessitating any changes in the construction of the tractor.

A further object is to provide an attachment of this character which is compact and durable and receives its power from the engine of the tractor.

A still further object is to provide mechanism of this character which, when not in use, can be removed from the tractor so that said tractor can be used for other purposes.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a top plan view of the complete attachment in position on a tractor.

Figure 2 is a side elevation of the structure illustrated in Figure 1.

Figure 3 is a front elevation of the tractor and showing applied thereto the frame on which the harvesting and husking mechanism is adapted to be mounted.

Figure 4 is a rear elevation of the structure shown in Figure 3.

Figure 5 is a top plan view of the structure shown in Figures 3 and 4.

Figure 6 is an enlarged section on line 6—6, Figure 3.

Figure 7 is a detailed view of a portion of the mechanism employed for actuating the snapping rolls.

Figure 8 is a detailed view of one form of mechanism which can be employed for driving the conveyors.

Referring to the figures by characters of reference A designates a tractor of a type which can be purchased in the open market and which includes a drive shaft B extending from one side thereof, and a tubular rear axle C, there being the usual front and rear supporting wheels D and E respectively.

The attachment constituting the present invention includes parallel angle rails 1 extending along the sides of the tractor rearwardly over the axle C and slightly forward beyond the front end of the tractor. These rails are provided with bearing members 2 adapted to be seated on the axle C and the front portions of the rails are supported by hangers 3 attached to the front portions of the sides of the engine and riveted or otherwise connected to the rails. These hangers 3 also support lower angle rails 4 the front portions of which are extended forwardly and horizontally while the rear portions are inclined upwardly and rearwardly as shown at 5 and have gripping members 6 secured to them for engaging the lower surface of the axle C. Bolts 7 are extended through the members 2 and 6 for the purpose of drawing them together so as to clamp upon the axle and thus hold the rails 1 and 4 fixed relative to the axle. Connecting strips 8 are secured to and interposed between the forward portions of the rails 1 and the lower rails 4. Angle strips 9 and 10 connect the rear portions of the rails 1 and are extended laterally therebeyond for the purpose hereinafter explained.

Mounted on the rear portions of the side rails 1 are standards 11 and additional standards 12 are mounted on said side rails 1 close to but slightly forward of the axle C. The upper ends of the standards 12 are connected by a cross beam 13 preferably formed of an angle member. Secured to the end portions of this beam 13 are inclined side frame members 14 each of which consists of two oppositely disposed angle strips having their upwardly extending flanges held together by rivets or the like as shown particularly in Figures 3 and 6. Interposed between but parallel with these side frame members 14 are angle strips 15 and these strips 14 and 15 are all secured to a transverse angle strip 16 suitably secured to the forward ends of the side rails 1. The lower ends of the inclined frame members 14 are also riveted or otherwise fastened to the lower side rails 4 close to the forward ends thereof while the lower ends of the angle strips 15 are connected by a transverse strip 17. This frame structure can be reinforced by crossed diagonal braces 18 interposed between the strips 15 and secured to the cross strips 16 and 17 as shown particularly in Figure 3.

The standards 12 are provided with crossed diagonal braces 19 secured to the upper and lower end portions thereof and crossed diagonal braces 20 are also provided between the standards 11 and side braces 21 and 22 are connected to the upper portions of the respective standards 12 and are secured to the respective side rails 1, these braces being inclined downwardly and rearwardly from the standards.

Connecting and extending laterally from the standards 11 above the cross strip 10 is a transverse strip 23 and another transverse strip 24 is secured to and extended laterally from the standards 12. These strips 23 and 24, serve to support a housing 25 containing suitable husking mechanism, not shown, the said housing being provided at the forward end of its shaft with an inlet 26 for the reception of the ears delivered from the snapping mechanism. Any suitable construction of husking mechanism can be used in the housing 25 and for this reason it is not deemed necessary to show or describe the same in detail. The husking mechanism is adapted to be driven by a transverse shaft 27 receiving motion through meshing gears 28 and 29 from a shaft 30 journaled on the side of the housing 25 and in a bearing 31 depending from one of the side frame members 14. A suitable elevator indicated generally at 32 is provided at the outlet of the housing 25 and can be driven by chain and sprocket mechanism 33 driven from the shaft 27.

A transverse shaft 34 is journaled beneath and supported by the side frame members 14 at a point above the engine of the tractor A, this shaft receiving motion through a sprocket 35 and a chain 36 from a sprocket 37 on the shaft B of the tractor. A gear 38 is secured to shaft 34 and meshes with a smaller gear 39 rotatable with a beveled pinion 40 which meshes with a beveled pinion 41 secured to the shaft 30. Thus it will be seen that when the shaft B is in operation motion will be transmitted therefrom to the husking and delivering mechanism.

Each of the side frame members 14 is connected to the adjacent strip 15 by cross heads 42 in which are journaled parallel shafts 43 having meshing gears 44 whereby the shafts are caused to rotate in opposite directions respectively. The upper end of one of the shafts 43 has a beveled gear 45 meshing with a beveled gear 46 secured to the upper end of a short shaft 47 journaled on one side of the frame member 14. The lower end of the shaft 47 carries a beveled gear 48 and the two beveled gears 48 carried by the two shafts 47 mesh with gears 49 secured to a transverse shaft 34. Thus it will be seen that the two pairs of shafts 43 located at the two sides of the machine will be operated simultaneously.

The lower portions of the shaft 43 are provided with snapping rolls 51 arranged in pairs as shown, the rolls of each pair having oppositely pitched spirals 52 whereby, when the rolls are rotated in opposite directions, they will act efficiently to snap the ears from the standing stalks. Forwardly diverging guide fingers 53 are extended from the lower ends of the frame members 14 and strips 15 to form a rearwardly converging throat 54 in which the standing stalks are received while being guided to the snapping rolls.

Arranged along the inner side of the strip 15 at the right of the machine is a guide trough 55 and overhanging the upper portions of the snapping rolls 51 at the right-hand side of the machine is a deflecting strip 56. This strip is designed to direct the snapped ears laterally into the trough 55. Another upwardly inclined trough 57 is located along the outer side of the frame member 14 at the left of the machine and is designed to receive snapped ears from the rolls 51 at the left side of the machine. A deflecting strip 58 overhangs the upper portions of these snapping rolls for the purpose of deflecting the snapped ears into the trough 57. The upper portion of the trough 55 merges into an obliquely disposed guide trough 59 and this trough 59 communicates with a chute 60 into which the trough 57 delivers. The chute is designed to direct the snapped ears from the troughs 59 and 57 into the housing 25 of the husking mechanism.

Shafts 61 and 62 are located adjacent the upper and lower ends respectively of the trough 57 and carry sprockets 63 on which is mounted an endless conveyor 64 having outstanding fingers 65. These fingers are designed to travel in the direction indicated by the arrows in Figure 1 and will engage the ears in the trough 57 and carry them upwardly to the chute 60. Another endless conveyor 66 is mounted on sprockets 67 located at the upper and lower ends of the trough 55, adjacent the upper end of the diagonally disposed trough 59, and at a point adjacent the upper ends of the snapping rolls 51 adjacent the left side of the machine. This conveyor 66 has outwardly extending fingers 68 which operate in the same manner as the fingers 65, these fingers travelling in the direction indicated by the arrows and constituting means for dragging the snapped ears upwardly within the troughs 55 and 59 to the chute 60.

One of the sprockets 67 is mounted on a shaft 69 and this shaft as well as the shaft 61 is provided with any suitable mechanism whereby the two endless conveyors can be operated simultaneously. For example, and as shown in Figure 8 beveled gears 70 can be connected to the shafts 61 and 69, these being driven by gears 71 secured to a transverse shaft 72. A sprocket 73 can be mounted on shaft 72 for receiving motion through a chain 74 from a sprocket 75 on the shaft 34.

It is to be understood that when the attachment constituting the present invention is to be applied to a tractor the same is placed in position thereover so that the member 2 will rest on the rear axle 3 and the members 6 drawn tightly against the axle. The hangers 4 are then attached to the front end of the engine by means of bolts or the like. With the parts thus located the snapping rolls will be extended in front of the wheels of the tractor and be inclined downwardly and forwardly. The conveyor 64 will be disposed at one side of the tractor while the conveyor 66 will extend around the front portion of the engine of the tractor. When the chain 36 is driven motion will be transmitted to the different drive mechanisms through the snapping rolls, to the conveyors, the husking mechanism and the delivering conveyor or elevator. Thus as the machine is propelled forwardly the standing stalks will be received within the throats 54, the ears will be snapped therefrom and directed into the troughs 55 and 57, the conveyors 66 and 64 will conduct the ears upwardly to the spout or chute 60, and from this spout or chute the ears will be directed into the inlet 26 of the husking mechanism and thence delivered to the elevator 32.

By reason of the skeleton construction of the frame of the attachment the same can be easily manipulated because its weight will be reduced to the minimum.

By providing the rear elevator 32 the corn, after being husked, can be delivered directly to a wagon drawn by the tractor and located directly back of it. Thus the standing rows of corn at the sides of the tractor are not disturbed because the wagon and the tractor will both travel along the two rows from which the corn has been removed.

What is claimed is:

1. An attachment for a tractor, including a frame adapted to be mounted removably on and to extend around the tractor, harvesting mechanism carried by each side portion of the frame, said mechanisms being positioned to travel directly in front of the rear wheels of the tractor to which the attachment is applied, a husking mechanism having an inlet, said mechanism being located upon the rear portion of the frame, an endless conveyor movable upwardly along one side of the frame and downwardly adjacent the other side thereof for engaging the harvested material from one harvesting mechanism and conveying it upwardly and laterally to the inlet of the husking mechanism, another endless conveyor for conveying the harvested material upwardly to said inlet of the husking mechanism from the second harvesting mechanism, there being sufficient space between opposed portions of the first named conveyor for receiving the engine portion of the tractor, and means for delivering husked material rearwardly from the husking mechanism to a trailer travelling back of and with the tractor, the maximum width of the attachment being less than the distance separating the rows bordering those rows to be acted upon by the harvesting mechanism.

2. The combination with a tractor of standard construction, of an attachment including a frame removably mounted on and extending around the tractor, said frame being supported solely by the tractor, forwardly extending troughs carried by the frame and extending downwardly and forwardly beyond the tractor and upwardly past the sides thereof, said troughs being spaced to receive the front portion of the tractor therebetween, a pair of snapping rolls supported by the side portions of the forwardly projecting part of the frame for acting upon spaced rows of standing stalks, said rolls constituting means for depositing ears in the respective troughs, a husking mechanism supported by one side portion of the frame above the back portion of the tractor, said husking mechanism being extended rearwardly beyond the tractor, the upper portion of one of the troughs being extended obliquely across a portion of the tractor to the husking mechanism, both of the troughs delivering into the husking mechanism, an endless conveyor for each trough, each conveyor having one side portion movable upwardly throughout the length of its trough, and drive mechanism for attachment to the power shaft of a tractor for actuating the rolls, conveyors, and husking mechanism.

In testimony that I claim the foregoing as my own, I have hereto affixed my signature.

HIRAM W. HOPKINS.